United States Patent
Sato et al.

(10) Patent No.: US 8,672,012 B2
(45) Date of Patent: Mar. 18, 2014

(54) ADHESIVE FORCE DEVELOPMENT UNIT, ADHESIVE-LABEL ISSUE DEVICE, AND PRINTER

(71) Applicant: Seiko Instruments Inc., Chiba (JP)

(72) Inventors: Yoshinori Sato, Chiba (JP); Kazuo Tani, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 13/750,248

(22) Filed: Jan. 25, 2013

(65) Prior Publication Data
US 2013/0192762 A1 Aug. 1, 2013

(30) Foreign Application Priority Data
Jan. 31, 2012 (JP) ................. 2012-018667

(51) Int. Cl.
- B65C 9/46 (2006.01)
- B29C 65/18 (2006.01)
- B32B 37/04 (2006.01)
- B32B 38/04 (2006.01)
- B32B 38/10 (2006.01)
- B32B 38/14 (2006.01)

(52) U.S. Cl.
USPC ............................ 156/387; 156/513; 156/514

(58) Field of Classification Search
USPC ......... 156/155, 196, 250, 252, 253, 256, 384, 156/387, 510, 513, 514
See application file for complete search history.

(56) References Cited

U.S. PATENT DOCUMENTS

| | | | | | |
|---|---|---|---|---|---|
| 3,143,454 | A | * | 8/1964 | Hannon | 156/499 |
| 3,239,396 | A | * | 3/1966 | Bohannon, Jr. | 156/52 |
| 3,764,441 | A | * | 10/1973 | Bley | 156/555 |
| 4,019,948 | A | * | 4/1977 | Hudalla et al. | 156/519 |
| 4,120,718 | A | * | 10/1978 | Hudalla | 156/499 |
| 4,268,345 | A | * | 5/1981 | Semchuck | 156/499 |
| 4,310,365 | A | * | 1/1982 | Elliott et al. | 156/55 |
| 4,743,334 | A | * | 5/1988 | Singer | 156/499 |
| 5,019,203 | A | * | 5/1991 | Singer | 156/309.9 |
| 5,071,504 | A | * | 12/1991 | Singer | 100/314 |
| 5,139,600 | A | * | 8/1992 | Singer | 156/301 |
| 5,601,685 | A | * | 2/1997 | Morse et al. | 156/540 |
| 5,806,277 | A | * | 9/1998 | Scheifele et al. | 53/374.4 |
| 7,714,597 | B2 | * | 5/2010 | Kazama | 324/756.01 |

(Continued)

FOREIGN PATENT DOCUMENTS

JP 2006-078733 A 3/2006

OTHER PUBLICATIONS

Machine English Translation of JP 2006-078733 (Dec. 11, 2013).*

*Primary Examiner* — Sing P Chan
(74) *Attorney, Agent, or Firm* — Brinks Gilson & Lione

(57) ABSTRACT

Provided are an adhesive force development unit, an adhesive-label issue device, and a printer which can develop a stable adhesive force regardless of a thickness of a functional layer made from a resin film or the like while suppressing an occurrence of a blocking phenomenon. A thermal head for adhesive force development having a plurality of heating elements arranged along a width direction of an adhesive label and heating the adhesive label from its adhesive layer side so as to form holes in an functional layer by the heating elements is provided, and heating means for heating at least hole-forming portions in the adhesive label is disposed at an upstream side or a downstream side relative to the thermal head along a carrying direction of the adhesive label.

20 Claims, 6 Drawing Sheets

(56) References Cited

U.S. PATENT DOCUMENTS

| | | | |
|---|---|---|---|
| 7,843,203 B2* | 11/2010 | Kazama | 324/754.07 |
| 7,878,117 B2* | 2/2011 | Katoh et al. | 101/128.4 |
| 8,502,847 B2* | 8/2013 | Sato et al. | 347/218 |
| 8,537,186 B2* | 9/2013 | Tani et al. | 347/171 |
| 2005/0266734 A1* | 12/2005 | Kazama | 439/700 |
| 2008/0190561 A1* | 8/2008 | Sanbongi et al. | 156/361 |
| 2008/0224720 A1* | 9/2008 | Kazama | 324/754 |
| 2008/0302259 A1* | 12/2008 | Katoh et al. | 101/128.4 |
| 2009/0015647 A1* | 1/2009 | Rawlings et al. | 347/213 |
| 2009/0015649 A1* | 1/2009 | Keeton et al. | 347/217 |
| 2009/0017236 A1* | 1/2009 | Keeton et al. | 428/32.68 |
| 2009/0017237 A1* | 1/2009 | Rawlings et al. | 428/32.84 |
| 2009/0120571 A1* | 5/2009 | Rasmussen | 156/283 |
| 2009/0209421 A1* | 8/2009 | Akiyama et al. | 503/227 |
| 2009/0311473 A1* | 12/2009 | Husemann et al. | 428/137 |
| 2010/0183995 A1* | 7/2010 | Sato et al. | 432/86 |
| 2010/0239792 A1* | 9/2010 | Akiyama et al. | 428/32.6 |
| 2011/0318477 A1* | 12/2011 | Sanbongi et al. | 427/58 |
| 2012/0069123 A1* | 3/2012 | Tani et al. | 347/171 |
| 2012/0082821 A1* | 4/2012 | Sanbongi et al. | 428/116 |
| 2012/0094064 A1* | 4/2012 | Sato et al. | 428/136 |
| 2012/0216951 A1* | 8/2012 | Kian et al. | 156/273.3 |
| 2012/0231950 A1* | 9/2012 | Tani et al. | 503/200 |
| 2012/0237710 A1* | 9/2012 | Tani et al. | 428/41.6 |
| 2012/0249713 A1* | 10/2012 | Sato et al. | 347/171 |
| 2013/0032288 A1* | 2/2013 | Lien et al. | 156/290 |
| 2013/0048624 A1* | 2/2013 | Sato et al. | 219/470 |
| 2013/0050383 A1* | 2/2013 | Sanbongi et al. | 347/171 |
| 2013/0052387 A1* | 2/2013 | Tani et al. | 428/41.6 |
| 2013/0133532 A1* | 5/2013 | Kian et al. | 101/35 |
| 2013/0133824 A1* | 5/2013 | Kian et al. | 156/264 |
| 2013/0171444 A1* | 7/2013 | Cho et al. | 428/323 |
| 2013/0220553 A1* | 8/2013 | Tani et al. | 156/499 |
| 2013/0221021 A1* | 8/2013 | Tani et al. | 221/73 |
| 2013/0245174 A1* | 9/2013 | Kian et al. | 524/293 |
| 2013/0248103 A1* | 9/2013 | Kian et al. | 156/273.3 |
| 2013/0251944 A1* | 9/2013 | Kian et al. | 428/141 |

* cited by examiner

ADHESIVE FORCE DEVELOPMENT UNIT, ADHESIVE-LABEL ISSUE DEVICE, AND PRINTER

RELATED APPLICATIONS

This application claims priority under 35 U.S.C. §119 to Japanese Patent Application No. 2012-018667 filed on Jan. 31, 2012, the entire content of which is hereby incorporated by reference.

BACKGROUND OF THE INVENTION

1. Field of the Invention

The present invention relates to an adhesive force development unit, an adhesive-label issue device, and a printer each for developing an adhesive force in an adhesive label.

2. Description of the Related Art

Conventionally, as label paper for an adhesive label to be used as a POS label for food, a distribution/transportation label, a medical label, a baggage tag, an indicator label for a bottle/can, and the like, there has been widely known label paper constituted by a recording surface (a printed surface) formed on a front surface of a base material, an adhesive layer formed on a back surface of the base material, and release paper (a separator) coating the adhesive layer.

In a case where this type of adhesive label is used by being attached to an adherend, it is necessary to peel off the release paper on the back surface from the adhesive layer after predetermined information such as a bar code or price is printed on the recording surface. However, it is practically difficult to collect and recycle the release paper which has been peeled off, which causes a problem that the release paper becomes industrial waste.

In view of this, from the viewpoint of environmental conservation and reduction of environmental impact, adhesive labels which do not use release paper have been used recently.

The adhesive labels which do not use release paper are, for example, as follows. Initially, there has been known an adhesive label (a first adhesive label) in which a mold releasing agent such as a silicone resin is applied on a surface of a recording surface, so that releasability between the recording surface and an adhesive layer is secured even if the adhesive label is wound into a roll. Further, there has been known an adhesive label (a second adhesive label) using a heat-activated adhesive layer which develops adhesiveness by heating an adhesive layer.

Further, another adhesive label (a third adhesive label) different from the first and second adhesive labels is also devised. FIG. 11 is a view illustrating a multilayer structure of an adhesive label 200. As illustrated in FIG. 11, the adhesive label 200 includes a multilayer structure in which a base material 201, an adhesive layer 202, and a resin film 203 are laminated. The resin film 203 is formed by using a polyester film and has a thickness of 1 to 3 μm. At the time of use, holes are formed in the resin film 203 by means of needles 210, or a stretching polyester film is used as the resin film 203 and holes are formed in the resin film 203 by a heating technique, e.g., thermal head heating, thereby breaking the resin film 203 to expose a lower adhesive layer 202 so that an adhesive force is developed.

In the meantime, in the adhesive label, a viscosity (fluidity) of an adhesive compound in the adhesive layer 202 and a thickness of the resin film 203 have a strong correlation with each other. That is, in order to develop an adhesive force in the adhesive label 200, after holes are formed in the resin film 203, it is necessary to cause the adhesive layer 202 to rise to a front surface of the adhesive label 200 at a side of the resin film 203 through the holes.

Therefore, as a thickness of the resin film 203 is larger, a pressure to attach the adhesive label 200 should be made stronger, which causes a problem that its convenience is impaired.

On the other hand, it is conceivable that a viscosity of the adhesive layer 202 is reduced so that the adhesive layer 202 easily rises to the front surface at the side of the resin film 203.

However, the adhesive label 200 is generally supplied as continuous-form paper (rolled paper) wound into a roll as illustrated in FIG. 12, the wound adhesive label 200 receives a certain pressure in its thickness direction under the influence of a tension caused by winding the adhesive label 200. In this case, as illustrated in FIG. 12, if the viscosity of the adhesive layer 202 is too low, an adhesive compound 220 might be pushed out to leak from end faces located at both sides of the adhesive label 200 in its width direction. This may cause a so-called blocking phenomenon, in which adhesive labels 200 stick to each other because of the adhesive compound 220 thus pushed out.

SUMMARY OF THE INVENTION

For the reasons mentioned above, in this field, an adhesive force development unit, an adhesive-label issue device, and a printer each of which can develop a stable adhesive force regardless of a thickness of a functional layer made from a resin film or the like while suppressing the occurrence of the blocking phenomenon have been expected.

An adhesive force development unit according to one aspect of the present invention is an adhesive force development unit for developing, by heating, an adhesive force of an adhesive label including a printable layer provided on one surface of a base material, and an adhesive layer provided on the other surface thereof and coated with a functional layer made from a non-adhesive resin film or the like, and the adhesive force development unit includes: a thermal head having a plurality of heating elements arranged along a width direction of the adhesive label and heating the adhesive label from its adhesive layer side so as to form holes in the functional layer by the heating elements; and heating means for heating at least hole-forming portions where the holes are formed in the adhesive label at a temperature not more than a penetration temperature, the heating means being disposed at an upstream side or a downstream side relative to the thermal head along a carrying direction of the adhesive label.

With this configuration, since a viscosity of an adhesive compound can be reduced at the upstream side or the downstream side relative to the thermal head, it is possible for the adhesive compound to easily rise to a back surface (the other surface) of the adhesive label through the holes. This makes it possible to develop a stable adhesive force regardless of a thickness of the functional layer.

In this case, since it is not necessary to use an adhesive compound having a low viscosity in advance, the adhesive compound does not leak from width-direction end faces of the label paper. Accordingly, when the adhesive label is wound into a roll, the occurrence of a blocking phenomenon can be suppressed and a long-long-term storage stability can be secured. Further, since there is no leakage of the adhesive compound which causes a blocking phenomenon, it is also possible to suppress the adhesive compound from being attached to the thermal head.

Further, as described above, since it is not necessary to use an adhesive compound having a low viscosity in advance, it is possible to use a relatively hard adhesive label. This allows a reduction in friction load between various rollers and between the thermal head and the adhesive label during conveyance, thereby making it possible to suppress paper jams or the like at the time of conveying the adhesive label.

Further, the adhesive force development unit according to the above aspect is configured such that the heating means is disposed at an upstream side relative to the thermal head along the carrying direction.

With this configuration, since the heating means is disposed at an upstream side relative to the thermal head along the carrying direction, it is possible to reduce the viscosity of the adhesive compound before the holes are formed. Accordingly, the holes are formed by the thermal head in a state where the viscosity of the adhesive compound is reduced by the heating means, thereby making it possible for the adhesive compound of the adhesive layer to easily rise to the back surface (the other surface) of the adhesive label through the holes after the holes are formed in the adhesive label. Accordingly, it is possible to develop an adhesive force in the adhesive label.

Further, a platen roller for conveying the adhesive label while sandwiching the adhesive label with the thermal head is disposed so as to face the thermal head.

With this configuration, since the adhesive label is conveyed while being pressed against the thermal head by the platen roller, the adhesive compound of the adhesive layer of which the viscosity is reduced can easily rise to the other surface of the adhesive label through the holes. This makes it possible to stably develop an adhesive force in the adhesive label.

Further, the heating means has a heat roller for conveying the adhesive label while heating the other surface (back surface) of the adhesive label.

With this configuration, since the heating means has the heat roller, the other surface of the adhesive label can be heated directly, so that the adhesive layer can be heated effectively.

Furthermore, an opposed roller for conveying the adhesive label while sandwiching the adhesive label with the heat roller is disposed so as to face the heat roller.

With this configuration, since the opposed roller is disposed so as to face the heat roller, the adhesive label to be conveyed while being sandwiched therebetween can be surely made contact with the heat roller, so that the adhesive layer can be heated surely.

Further, the heating means is a halogen lamp.

With this configuration, since the adhesive label can be indirectly heated, layout characteristics of the heating means can be improved.

Moreover, the thermal head includes a substrate on which the heating elements are arranged, and the heating means includes a heat generator provided on the substrate so as to heat the adhesive label.

With this configuration, since the thermal head is integrated with the heating means, it is possible to suppress upsizing of the device. Further, since the heating means can be made closer to the thermal head, it is possible to easily maintain a state where the viscosity of the adhesive compound is reduced until the adhesive label arrives at the heating elements.

Furthermore, the thermal head preheats the hole-forming portions of the functional layer, and then performs heating to form the holes.

With this configuration, since penetration to the functional layer is enhanced in addition to the improvement in easy rise of the adhesive compound due to the reduction in the viscosity, it is possible to develop a more stable adhesive force.

Further, an adhesive-label issue device according to one aspect of the present invention includes: an adhesive force development unit according to the above aspect; and a cutter unit disposed at an upstream side relative to the adhesive force development unit in the carrying direction so as to cut belt-shaped label paper in a desired length.

In this configuration, only desired areas in the functional layer are heated and penetrated by the adhesive force development unit after the belt-shaped label paper has been cut into a desired length by the cutter unit. This accordingly makes it possible to develop a stable adhesive force, so that a high-quality adhesive label can be issued.

Further, a printer according to one aspect of the present invention includes: an adhesive-label issue device according to the above aspect; and a printing unit disposed at an upstream side relative to the adhesive force development unit in a carrying direction and performing printing on the printable layer.

With this configuration, since the printer includes the adhesive-label issue device according to the above aspect, desired information can be stably printed on the printable layer before an adhesive force is developed by the adhesive force development unit. As a result, a high-quality adhesive label in which various information is printed clearly and a stable adhesive force is developed can be obtained.

According to the adhesive force development unit, the adhesive-label issue device, and the printer according to the above respective aspects of the present invention, it is possible to develop a stable adhesive force regardless of a thickness of the functional layer made from a resin film or the like while suppressing an occurrence of a blocking phenomenon.

DETAILED DESCRIPTION OF THE PREFERRED EMBODIMENTS

The following describes a first embodiment of the present invention with reference to drawings. Note that the following description deals with a thermal printer including an adhesive force development unit of the present invention.

Figure 1:
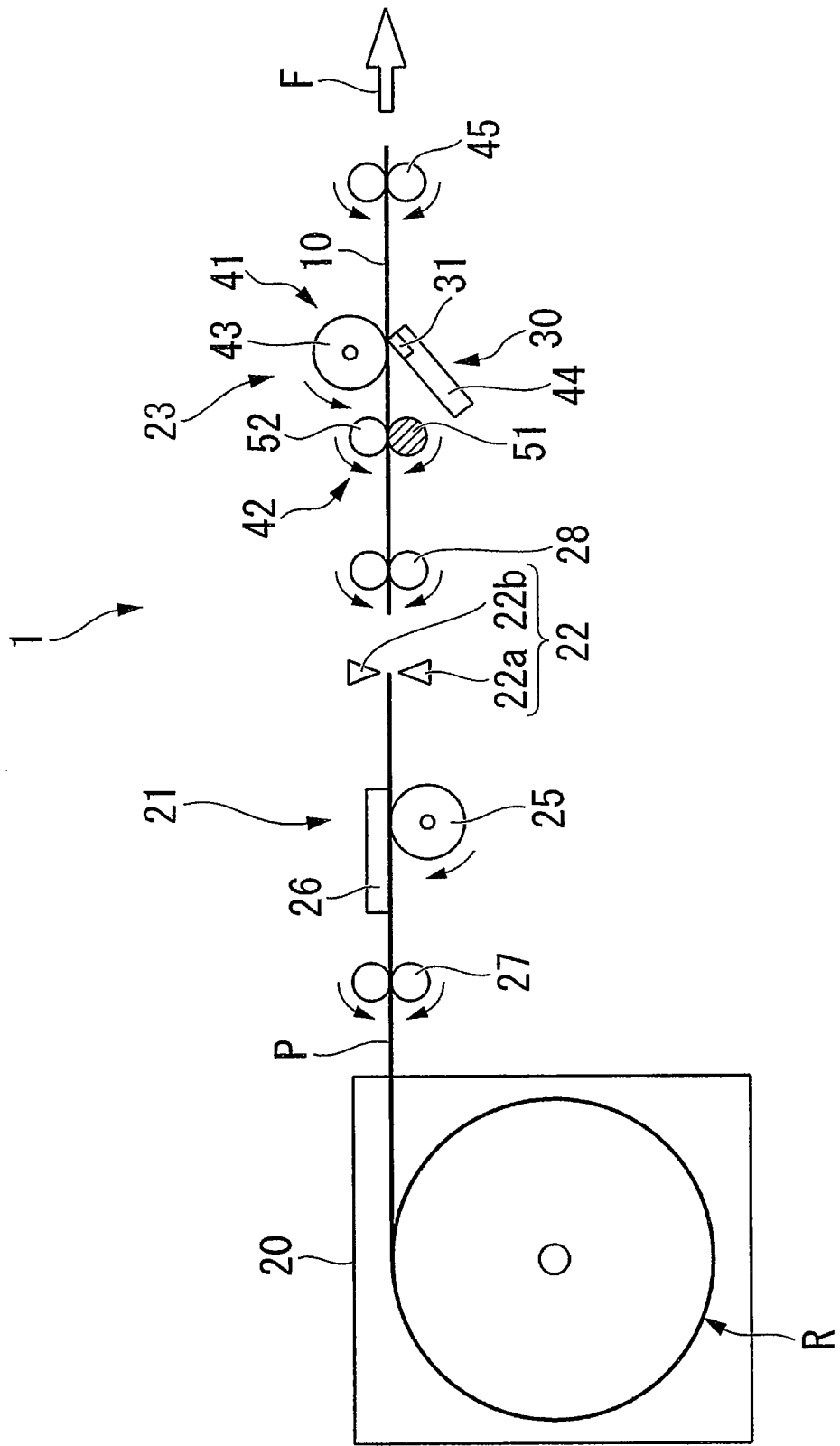
FIG. 1 is a schematic configuration diagram illustrating a printer in an embodiment of the present invention.

FIG. 1 is a schematic configuration diagram illustrating the printer in the present embodiment of the present invention.

As illustrated in FIG. 1, a thermal printer 1 (hereinafter referred to as the printer 1) of the present embodiment is a device which uses rolled paper R in which an adhesive label 10 is wound into a roll, performs printing on belt-shaped label paper P sent out from the rolled paper R, cuts the label paper P into a predetermined length to form an adhesive label 10, and issues a label in a state where an adhesive force is developed in the adhesive label 10 by a thermal head 30 for adhesive force development. In the description of the present embodiment, a carrying direction of the label paper P is assumed F, a side closer to the rolled paper R is assumed an upstream side, and a tip side of the carrying direction F is assumed a downstream, in a state illustrated in FIG. 1.

Figure 2A:
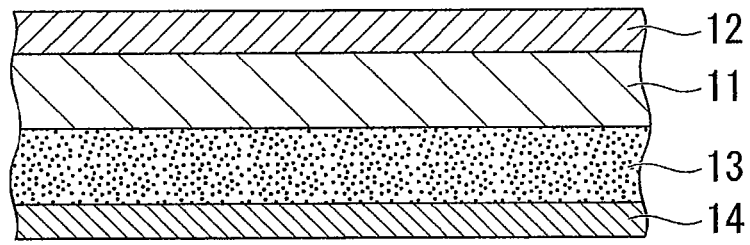
FIGS. 2A and 2B are cross-sectional views of an adhesive label.
Figure 2B:
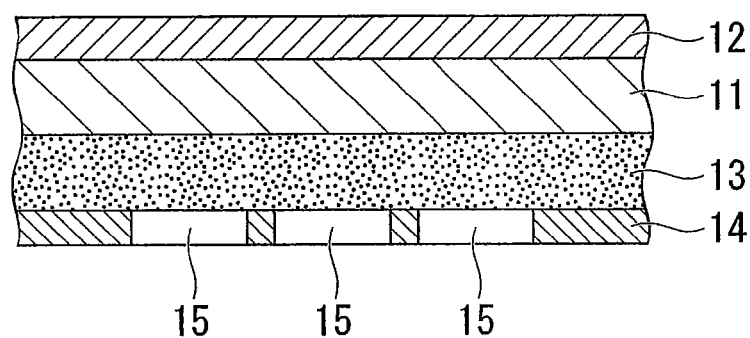

FIG. 2 is a cross-sectional view of the adhesive label in the present embodiment of the present invention.

First of all, the rolled paper R is formed in such a manner that belt-shaped label paper P is wound, and is accommodated rotatably in a rolled-paper accommodation section 20 disposed at an upstream end of the printer 1. More specifically, the label paper P (an adhesive label 10) includes a base material 11, a printable layer 12 laminated on one surface of the base material 11, an adhesive layer 13 laminated on the other surface of the base material 11, and a non-adhesive functional layer 14 covering a surface of the adhesive layer 13, as illustrated in FIG. 2. Note that, in the following description, a side of the label paper P at which the printable layer 12 is provided is assumed a front side (one surface) and another side thereof where the functional layer 14 is provided is assumed a back side (the other surface).

The printable layer 12 is a heat-sensitive recording layer on which a color is developed by heating, and is formed over a front surface of the base material 11.

The adhesive layer 13 is a layer made from an acrylic adhesive compound and having a thickness of around 10 μm to 20 μm, and is formed over a back surface of the base material 11. Note that the adhesive compound is not limited to the acrylic adhesive compound, and may be, for example: a rubber adhesive compound such as a natural rubber, a styrene-butadiene rubber (SBR), or a polyisobutylene rubber; a silicon adhesive compound made from silicon having a high cohesive force and a silicon resin having a high adhesive force; and the like.

The functional layer 14 coats a whole front surface of the adhesive layer 13. More specifically, the functional layer 14 is a film made from PET, PP, or the like and having a thickness of around 1 μm, and is a hole forming layer in which holes 15 (see FIG. 2(b)) are formed by melting the layer by heating. The holes 15 are opened by locally heating by heating elements 31 of the thermal head 30 for adhesive force development (which will be described later). When the holes 15 are formed, the adhesive compound of the adhesive layer 13 is exposed on the back surface of the adhesive label 10 through the holes 15, thereby developing an adhesive force. Note that in a case of using PP as the functional layer 14, a melting point, that is, a penetration temperature at which the holes 15 are formed is around 170° C. In a case of using PET, the melting point is around 260° C.

Next will be explained the printer 1.

As illustrated in FIG. 1, the printer 1 includes the aforementioned rolled-paper accommodation section 20 for accommodating the rolled paper R therein, a printing unit 21 for performing printing on the printable layer 12 of the label paper P sent out from the rolled paper R, a cutter unit 22 for cutting the label paper P subjected to the printing in the printing unit 21 into an adhesive label 10 having a desired length, and an adhesive force development unit 23 for developing an adhesive force in the adhesive label 10 by heating the adhesive label 10 thus cut by the cutter unit 22.

The printing unit 21 is a thermal print mechanism including a printing platen roller 25 and a printing thermal head 26, which are disposed so as to face each other in a thickness direction (an up-to-down direction in FIG. 1) of the adhesive label 10, and is disposed at a downstream side relative to the rolled-paper accommodation section 20. The printing thermal head 26 is a line scan head in which a plurality of heating elements are arranged along a width direction of the label paper P, and is disposed on a front side of the label paper P. The printing thermal head 26 is pressed toward the label paper P (toward the printing platen roller 25) by an elastic member (not illustrated) such as a coiled spring, so as to be pressure contacted with a peripheral surface of the printing platen roller 25.

The printing platen roller 25 is disposed on a back side of the label paper P, and is configured to be rotatable by a driving source (not illustrated). The printing unit 21 can send out the label paper P from the rolled paper R to convey the label paper P by driving the driving source to rotate the printing platen roller 25 with the label paper P being sandwiched between the printing platen roller 25 and the printing thermal head 26. Note that first conveyor rollers 27 for sending out the label paper P toward a downstream side while sandwiching the label paper P sent out from the rolled paper R therebetween in the thickness direction is disposed between the rolled-paper accommodation section 20 and the printing unit 2.

The cutter unit 22 is a cutting mechanism having a fixed blade 22a and a movable blade 22b, and is disposed at a downstream side relative to the printing unit 21 along the carrying direction F. The fixed blade 22a and the movable blade 22b are disposed so that their cutting edges face each other across the label paper P in the thickness direction. The fixed blade 22a is disposed on the back side of the label paper P, while the movable blade 22b is disposed on the front side of the label paper P. Note that the fixed blade 22a may be disposed on the front side of the label paper P, while the movable blade 22b may be disposed on the back side of the label paper P. The movable blade 22b is configured to be slidable to be close to or distanced from the fixed blade 22a, so that the label paper P can be wedged between the movable blade 22b and the fixed blade 22a and cut. Note that second conveyor rollers 28 for sending out a cut adhesive label 10 toward the downstream side while sandwiching the adhesive label 10 therebetween in the thickness direction is disposed at a downstream side relative to the cutter unit 22.

Figure 3:
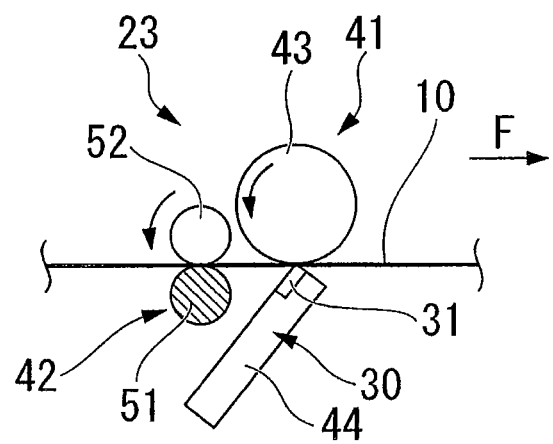
FIG. 3 is a schematic configuration diagram of an adhesive force development unit.

FIG. 3 is a schematic configuration diagram of the adhesive force development unit.

As illustrated in FIGS. 1 and 3, the adhesive force development unit 23 includes penetration means 41 for forming holes 15 in the functional layer 14 by heating the adhesive label 10, and heating means 42 for preheating the adhesive label 10, the heating means 42 being disposed at an upstream side relative to the penetration means 41.

The penetration means 41 includes a platen roller 43 for adhesive force development and a thermal head 30 for adhesive force development, which are disposed so as to face each other along a thickness direction of the adhesive label 10.

The thermal head 30 for adhesive force development is a line scan head in which a plurality of heating elements 31 are arranged along a width direction of the adhesive label 10 on a substrate 44, and is disposed at a back side of the adhesive label 10.

The substrate 44 is a board made from ceramic or the like, which assumes the width direction of the adhesive label 10 as a longitudinal direction. The substrate 44 is pressed toward the platen roller 43 for adhesive force development by an elastic member (not illustrated) such as a coiled spring, so that a downstream end in the substrate 44 is pressure contacted with a peripheral surface of the platen roller 43 for adhesive force development.

Each of the heating elements 31 formed on the substrate 44 forms a hole 15 in the functional layer 14 by individually heating the functional layer 14 of the adhesive label 10.

The platen roller 43 for adhesive force development is a roller configured to be rotatable by a driving source (not illustrated), and sends out the adhesive label 10 toward a downstream side while wedging the adhesive label 10 with the thermal head 30 for adhesive force development. Note that third conveyor rollers 45 (see FIG. 1) for sending out the adhesive label 10 in which an adhesive force is developed toward the downstream side while sandwiching the adhesive label 10 therebetween in the thickness direction are disposed at a further downstream side relative to the penetration means 41.

Here, the heating means 42 includes a heat roller 51 disposed at a back side of the adhesive label 10 to be sent out from the second conveyor rollers 28, and an opposed roller 52 disposed at a front side of the adhesive label 10.

The heat roller 51 heats the adhesive label 10 from its back side, and is disposed between the adhesive force development unit 23 and the second conveyor rollers 28 along the thickness direction of the adhesive label 10.

A peripheral surface of the opposed roller 52 comes in contact with a peripheral surface of the heat roller 51, and is configured to be rotatable by a driving source (not illustrated). Accordingly, the heat roller 51 follows a rotation of the opposed roller 52 so as to rotate in a direction opposite to the opposed roller 52. The adhesive label 10 is pressed by the heat roller at the side of the functional layer 14, so that the adhesive label 10 is sent out toward the penetration means 41 at a downstream side while being heated directly. Note that the heat roller 51 may be a drive roller and the opposed roller 52 may be a driven roller.

Next will be explained an operation of the printer 1.

Initially, an operation preparation of the printer 1 is performed. More specifically, as illustrated in FIG. 1, after the rolled paper R is set in the rolled-paper accommodation section 20, the label paper P is drawn out from the rolled-paper accommodation section 20, and a downstream end of the label paper P is inserted between the first conveyor rollers 27.

Then, the printer 1 is connected to an external input device (not illustrated), so as to output label information with a label issue instruction with respect to the printer 1 from the external input device. Examples of this label information include size information of the adhesive label 10, printing data, formation pattern data of the holes 15 for developing an adhesive force, and the liked. When the printer 1 receives the label issue instruction and the label information, a driving source (not illustrated) is driven, so that power of the driving source is transmitted to various rollers, thereby causing the various rollers to rotate. This causes the label paper P inserted between the first conveyor rollers 27 to be sent out at a downstream side and to be supplied to the printing unit 21.

The label paper P thus supplied to the printing unit 21 is sent out between the printing platen roller 25 and the printing thermal head 26 toward a downstream side. At this time, the printing thermal head 26 is driven to perform a printing operation according to label information. Hereby, when the label paper P passes between the printing platen roller 25 and the printing thermal head 26, a bar code, text, and the like are sequentially printed on a printable layer 12 of the label paper P (a printing step).

Subsequently, the label paper P which has passed through the printing unit 21 is supplied to the cutter unit 22 (a cutting step). The label paper P thus supplied to the cutter unit 22 is sent out toward the downstream side between the fixed blade 22a and the movable blade 22b. When the label paper P passes between the fixed blade 22a and the movable blade 22b only by a desired length, the cutter unit 22 is activated so that the movable blade 22b slides toward the fixed blade 22a. This makes it possible to cut the label paper P while being wedged between the movable blade 22b and the fixed blade 22a, so that the adhesive label 10 adjusted in the desired length can be obtained. Note that a method for detecting that the label paper P has passed only by a desired length may be performed by use of an optical sensor or a micro switch (not illustrated), or may be performed based on calculated values of a label linear dimension and a paper feed amount of the label paper P according to the label information. The adhesive label 10 which has passed through the cutter unit 22 is then sent out toward the downstream side by the second conveyor rollers 28, and supplied to the adhesive force development unit 23 (an adhesive force development step).

Figure 4:
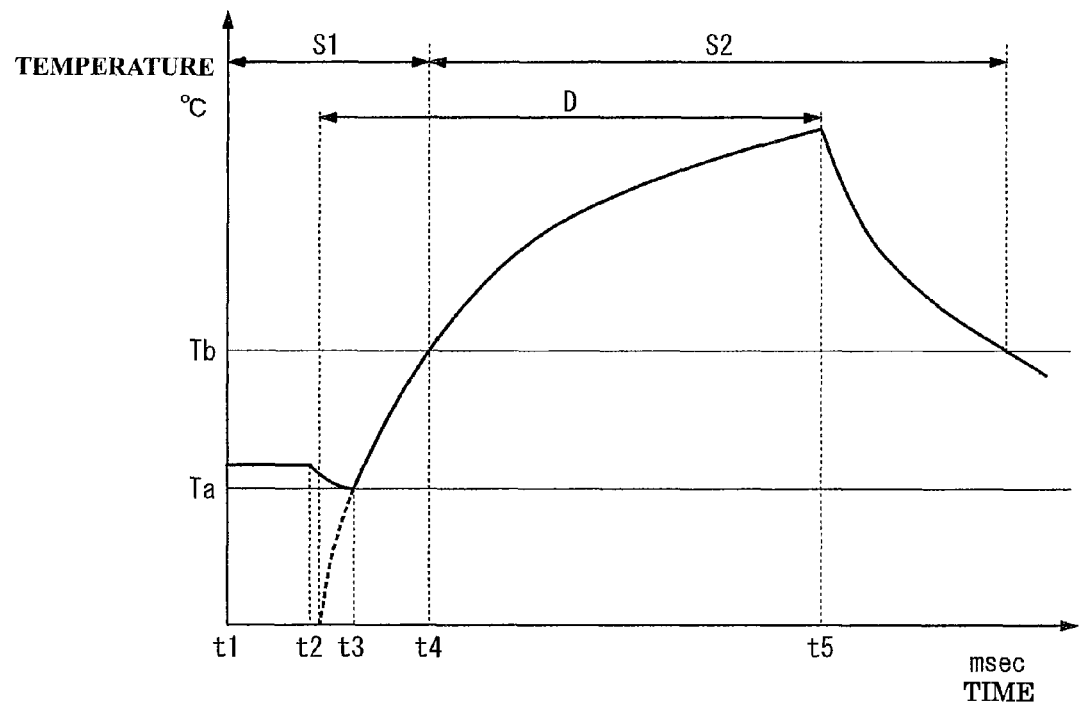
FIG. 4 is a graph illustrating a temperature change (° C.) of an adhesive label when the adhesive label passes through the adhesive force development unit in the present embodiment.

Here, FIG. 4 is a graph illustrating a temperature change (° C.) of an adhesive label when the adhesive label passes through the adhesive force development unit 23 in the present embodiment. Note that a dashed line in the graph indicates a temperature change in a case of a conventional adhesive force development unit, namely in a case where no heating means is provided. Further, the temperature change illustrated in the graph indicates a temperature change at a given one point in the adhesive label 10 conveyed continually.

As illustrated in FIGS. 1 and 4, the adhesive label 10 to be supplied to the adhesive force development unit 23 is first inserted between the heat roller 51 and the opposed roller 52 of the heating means 42 at a time t1 (a preheating step). The adhesive label 10 is directly heated by the heat roller 51 directly from its back side while being sandwiched between these heat roller 51 and opposed roller 52 and sent out toward the downstream side. More specifically, a thermal energy supplied to the adhesive label 10 from the heat roller 51 is transmitted to the adhesive layer 13 via the functional layer 14, thereby heating the adhesive layer 13. This increases an adhesive-compound temperature of the adhesive layer 13 to a temperature not less than a fluidity improving temperature Ta at which a viscosity is reduced (a fluidity is improved). Note that even if the adhesive label 10 is heated from its back side, the base material 11 functions as a heat insulating material, so that the thermal energy can be suppressed from being transmitted to the printable layer 12, and even if the printable layer 12 is a heat-sensitive recording layer, a change in quality of the printable layer 12 can be suppressed.

In the preheating step, in order to reduce the viscosity of the adhesive compound, it is preferable to heat the adhesive layer 13 to a temperature not more than a penetration temperature (melting point) of the functional layer 14 but not less than 100° C. On the other hand, in a case where an acrylic or rubber adhesive compound is used for the adhesive layer 13, for example, it is not preferable that the temperature of the adhesive layer 13 be 160° C. or more, because the adhesive compound might change in quality. In view of this, in order to surely suppress the change in quality of the adhesive compound and to reduce the viscosity of the adhesive compound, it is preferable to heat the adhesive layer 13 in a range of not less than 100° C. but not more than 120° C. in the preheating step. Note that in a case where a silicon adhesive compound is used, a temperature at which the adhesive compound changes in quality is higher than that of the acrylic or rubber adhesive compound.

Subsequently, the adhesive label 10 which has passed through the heating means 42 at a time t2 is supplied to the penetration means 41 at a time t3 (a penetration step). The adhesive label 10 supplied to the penetration means 41 is inserted between the thermal head 30 for adhesive force development and the platen roller 43 for adhesive force development and conveyed toward the downstream side while being pressed against the thermal head 30 for adhesive force development by the platen roller 43 for adhesive force development. At this time, a thermal energy is applied individually to each of the heating elements 31 of the thermal head 30 for adhesive force development based on the label information. Accordingly, each of the heating elements 31 to which the thermal energy is applied selectively generates heat in an energy amount necessary for penetration, based on input penetration information. Therefore, in the functional layer 14 the of adhesive label 10, only portions having contact with heating elements 31 which generate heat are heated locally.

When a temperature of the heated portions in the functional layer 14 becomes equal to or higher than the melting point (the penetration temperature) Tb at a time t4, the functional layer 14 is melted to form holes 15. Note that in the graph, a time during which the adhesive label 10 is maintained at a temperature not less than the fluidity improving temperature Ta but not more than the melting point Tb, that is, a time between the time t1 to t4 is taken as a preheating time S1 during which a viscosity of the adhesive compound is reduced, and a time during which the temperature is maintained to be not less than the melting point Tb is taken as a penetration time S2 for penetration of the functional layer 14. Further, the energy amount is determined based on a pulse width of an applied voltage and an applied power, and the applied power is determined based on an average resistance of the heating elements 31 and an applied voltage to the heating elements 31.

In addition, since the holes 15 are formed, the adhesive layer 13 of the adhesive label 10 is exposed through the holes 15. At this time, the viscosity of the adhesive layer 13 is reduced by the heating means 42 and the adhesive label 10 is conveyed toward the downstream side while being pressed against the thermal head 30 for adhesive force development by the platen roller 43 for adhesive force development. As a result, the adhesive compound of the adhesive layer 13 rises to a front surface of the functional layer 14, that is, to the back surface of the adhesive label 10 through the holes 15. Hereby, an adhesive force can be developed in the adhesive label 10.

The adhesive label 10 in which the adhesive force is developed passes through the penetration means 41 at a time t5 and is then conveyed toward the downstream side by the third conveyor rollers 45. Thus, the adhesive label 10 can be issued in such a state where the adhesive force is developed.

Here, in a case where PET having a thickness of about 1 (μm) is used for the functional layer 14, a time for transmitting the thermal energy to the adhesive layer 13 in the preheating step is about 0.1 (msec) (a heat transmission speed in the functional layer 14 is about 0.1 (msec/μm)).

Further, in order that the adhesive compound of the adhesive layer 13 is caused to rise to the back side of the adhesive label 10 in the subsequent penetration step, it is preferable that the viscosity be reduced only within a thickness (e.g., around 1 μm) equivalent to the thickness of the functional layer 14 in the adhesive layer 13 in the preheating step. In this case, when a time for transmitting heat within a thickness of 1 (μm) in the adhesive layer 13 is about 0.1 (msec), a heating time in the preheating step may be set to about 0.2 (msec) or more in total. That is, when a thickness of the functional layer 14 is assumed T (μm) and the heating time is assumed S (msec), a relationship between T and S can be regarded as $S \geq 0.2\,T$ ($S \geq 0.1 \times 2T$).

Note that in a case where PET having a thickness of about 1 (μm) is used for the functional layer 14, a pulse width D necessary to form the holes 15 only in the penetration step without performing the preheating step is generally 0.5 (msec) or more. On that account, the aforementioned heating time (about 0.2 (msec)) in the preheating step is sufficiently short. Accordingly, only the viscosity of the adhesive compound can be reduced without forming the holes 15 in the preheating step. Further, in the present embodiment, the functional layer 14 is heated in advance in the preheating step, and therefore the pulse width in the penetration step can be made shorter than 0.5 (msec). However, even in that case, the pulse width in the penetration step becomes longer than the heating time (0.2 (msec)) in the preheating step.

As such, the adhesive force development unit 23 of the present embodiment is configured such that the heating means 42 for heating the adhesive label 10 is disposed at an upstream side relative to the penetration means 41 along the carrying direction F.

With this configuration, the viscosity of the adhesive compound can be reduced just before the penetration means 41. This accordingly allows the adhesive layer 13 to easily rise to the back side of the adhesive label 10 through the holes 15 at the time when the holes 15 are formed. This makes it possible to develop a stable adhesive force regardless of the thickness of the functional layer 14.

In this case, since it is not necessary to use an adhesive compound having a low viscosity in advance, the adhesive compound does not leak from width-direction end faces of the label paper P (the adhesive label 10). Accordingly, an occurrence of a blocking phenomenon can be suppressed and a long-long-term storage stability can be secured. Further, since there is no leakage of the adhesive compound which causes a blocking phenomenon, it is also possible to suppress the adhesive compound from being attached to the thermal head 30 for adhesive force development.

Further, as described above, since it is not necessary to use an adhesive compound having a low viscosity in advance, it is possible to use a relatively hard adhesive label 10. This allows a reduction in friction load between various rollers and between the thermal head 26, 30 and the adhesive label 10 during conveyance, thereby making it possible to suppress paper jams or the like of the adhesive label 10.

In the meantime, in a case where the adhesive label 10 is heated only by the penetration means 41 (the thermal head 30 for adhesive force development) like a conventional technique, the holes 15 might be formed before the viscosity of the adhesive compound in the adhesive layer 13 is fully reduced because the formation of the holes 15 is started in less time after the adhesive label 10 is heated as indicated by a period of time from a start point of the dashed line to t4 in FIG. 4. This is because when the formation of the holes 15 is started, an adhesion portion of the functional layer 14 to the adhesive layer 13 is separated and heat cannot be transmitted to the adhesive layer 13 through the functional layer 14.

In contrast, in the present embodiment, since the heating means 42 is disposed at an upstream side relative to the penetration means 41 along the carrying direction F, it is possible to reduce the viscosity of the adhesive compound right before the holes 15 are formed. Hereby, the holes 15 are formed by the penetration means in a state where the viscosity of the adhesive compound is reduced, thereby allowing the adhesive compound of the adhesive layer 13 to easily rise to the back surface of the adhesive label 10 through the holes 15 at the time when the adhesive label 10 is conveyed toward a downstream side while being pressed against the thermal head 30 for adhesive force development by the platen roller 43 for adhesive force development. Accordingly, it is possible to stably develop an adhesive force in the back surface of the adhesive label 10.

Further, since the heating means 42 is the heat roller 51, the back surface of the adhesive label 10 can be heated directly, so that the adhesive layer 13 can be heated effectively.

Also, since the opposed roller 52 for conveying the adhesive label 10 is disposed so as to face the heat roller 51 across the adhesive label 10 sandwiched therebetween, the adhesive label 10 can be surely made contact with the heat roller 51, so that the adhesive layer 13 can be heated surely.

Further, since the functional layer 14 can be heated in advance in the preheating step, it is possible to shorten the heating time in the penetration step. This makes it possible to suppress an increase in the power consumption even if the preheating step is added.

According to a label issue device having the adhesive force development unit 23, a stable adhesive force can be developed only in a desired area by the adhesive force development unit 23 after the label paper P has been cut into a desired length by the cutter unit 22, thereby making it possible to issue a high-quality adhesive label 10.

Further, according to the printer 1 of the present embodiment, desired information can be stably printed on the printable layer 12 before an adhesive force is developed by the adhesive force development unit 23, thereby resulting in that a high-quality adhesive label 10 in which various information is printed clearly and a stable adhesive force is developed can be obtained.

Figure 5:
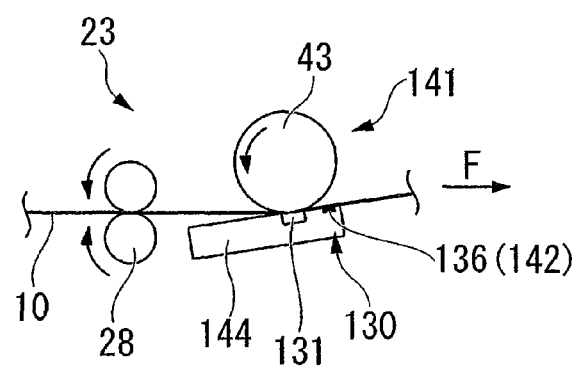
FIG. 5 is a side view illustrating another configuration of a thermal head for adhesive force development in a second embodiment.
Figure 6:
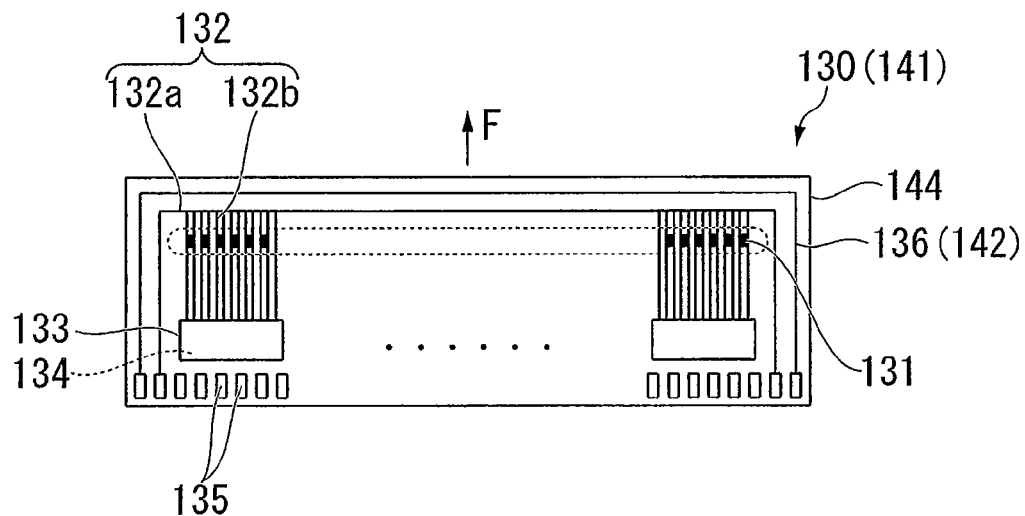
FIG. 6 is a plane view illustrating the thermal head for adhesive force development in the second embodiment.

The following describes a second embodiment of the present invention. FIG. 5 is a side view illustrating another configuration of a thermal head for adhesive force development in the second embodiment, and FIG. 6 is a plane view illustrating the thermal head for adhesive force development. Note that in FIG. 6, a downside of the page space is assumed an upstream side in a carrying direction F, and an upside of the page space is assumed a downstream side in the carrying direction F. The second embodiment is different from the first embodiment in that the thermal head for adhesive force development is integrated with the heating means. In view of this, in the following description, a configuration the same as in the above embodiment has the same reference sign as in the above embodiment and the explanation thereof is omitted.

As illustrated in FIGS. 5 and 6, a thermal head 130 for adhesive force development in penetration means 141 in the present embodiment mainly includes a substrate 144 placed along a carrying direction F, a plurality of heating elements 131 arranged along a longitudinal direction on the substrate 144, and an electrode section 132 connected to the heating elements 131. Note that the heating elements 131 of the present embodiment are arranged at a downstream side along the carrying direction F on a top surface (a side facing the platen roller 43 for adhesive force development) of the substrate 144, and is pressure contacted with a peripheral surface of the platen roller 43 for adhesive force development.

The electrode section 132 is formed in such a manner that Al, Cu, Au, or the like is laminated by sputtering on the substrate 144 and then patterned by a photolithography technique or the like, and is constituted by a common electrode section 132a conductive to all of the plurality of heating elements 131, and individual electrode sections 132b each conductive to each of the heating elements 31.

The individual electrode sections 132b are connected to driver ICs 134 protected by sealing sections 133 made from resin or the like. The driver ICs 134 are placed along a longitudinal direction at a upstream side in the substrate 144, and each of the individual electrode sections 132b is arranged in a comb-like shape from a corresponding driver IC 134 toward a downstream side in the substrate 144.

Further, at an upstream side relative to the driver ICs 134 in the substrate 144, a plurality of external connection terminals 135 are arranged along the longitudinal direction of the substrate 144. Each of the external connection terminals 135 is individually connected to a corresponding driver IC 134 via an electric wiring (not illustrated) and both ends of the common electrode section 132a are connected to different external connection terminals 135. The external connection terminals 135 are connected to CPU (not illustrated) via a flexible substrate (not illustrated). Heat generation of each of the heating elements 131 is controlled based on a signal input from this CPU, so that a thermal energy is selectively applied to each of the plurality of heating elements 131 via the electrode section 132, thereby allowing each of the heating elements 131 to generate heat individually.

Here, the heating means 142 of the present embodiment includes a heat generator 136 which is provided in the substrate 144 so as to heat the adhesive label 10. The heat generator 136 is a wire-rod heating element extending along a periphery of the substrate 144 at both sides along the longitudinal direction of the substrate 144 and at a downstream side of the substrate 144, and both ends of the heat generator 136 in its extending direction are individually connected to different external connection terminals 135. Heat generation of the heat generator 136 is controlled based on a signal input from the CPU so as to heat the whole substrate 144.

In the second embodiment, in a state where the substrate 144 (thermal head substrate) is heated by the heating element 136, the adhesive label 10 is inserted between the thermal head 130 for adhesive force development and the platen roller 43 for adhesive force development (see FIG. 1). As a result, before arriving at the heating elements 131, the adhesive label 10 is heated by the substrate 144 from its back side, so that the viscosity of the adhesive compound of the adhesive label 10 is reduced.

After that, when the adhesive label 10 passes through the heating elements 131, only those parts of the functional layer 14 which correspond to heating elements 131 which generate heat are further heated. This causes the functional layer 14 to melt, thereby forming the holes 15.

According to the second embodiment, the operation-effect similar to the first embodiment can be obtained, and since the thermal head 130 for adhesive force development of the penetration means 141 is integrated with the heating means 142, it is possible to suppress upsizing of the device in comparison with a case where the heating means 142 is provided separately. Moreover, since the heating means 142 can be made closer to the thermal head 130 (the heating elements 131) for adhesive force development, the temperature of the adhesive compound can be easily maintained to be not lower than the fluidity improving temperature Ta until the adhesive label 10 arrives at the heating elements 131.

Figure 7:
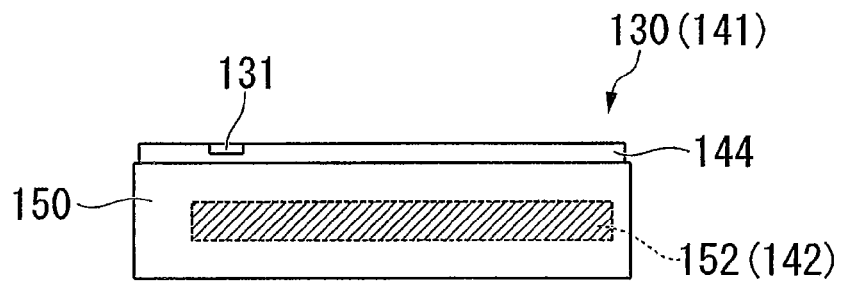
FIG. 7 is a side view illustrating another configuration of a thermal head for adhesive force development.
Figure 8:
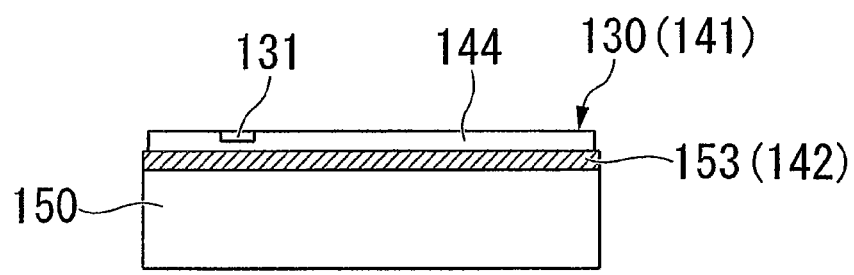
FIG. 8 is a side view illustrating another configuration of a thermal head for adhesive force development.

Note that the second embodiment deals with a case where the heat generator 136 is disposed on the substrate 144 as the heating means 142 integrated with the thermal head 130 for adhesive force development, but the present embodiment is not limited to this. For example, as illustrated in FIG. 7, a heat generator 152 may be buried in a head support 150 for supporting the substrate 144, or as illustrated in FIG. 8, a sheetlike heat generator 153 may be provided between the head support 150 and the substrate 144.

In the second embodiment, the heat generator 136 for heating the whole substrate 144 is disposed on the thermal head 130, but preheating to the adhesive layer 13 may be also performable by devising a method for applying a thermal energy to the heating elements 131. That is, in this third embodiment, the heating elements 131 are caused to generate heat only for a period of time (e.g., time S) shorter than a time for penetration at positions to be penetrated (places to form holes 15) on the functional layer 14. After a time shorter than the time S has passed, the heating elements 131 are caused to generate heat just for the time for penetration. Since the thermal energy is applied to a single heat generator twice as such, a total time from the preheating to the penetration is longer than in the first and second embodiments, but the structure can be simplified.

Figure 9:
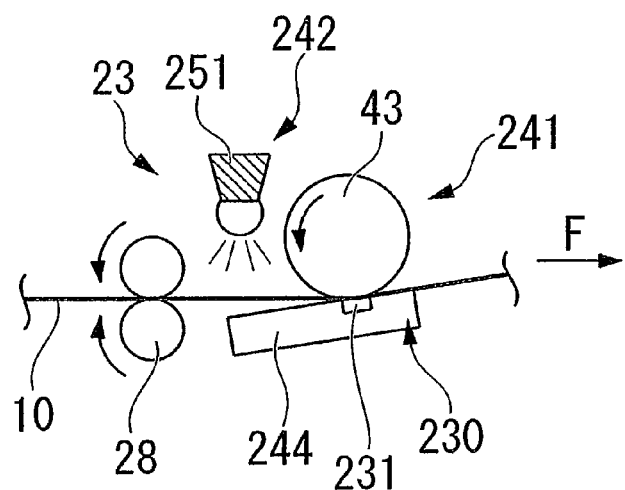
FIG. 9 is a schematic configuration diagram of an adhesive force development unit in a modified embodiment.

The following describes a modified embodiment of the first embodiment. FIG. 9 is a schematic configuration diagram of an adhesive force development unit in the modified embodiment. The present modified embodiment is different from the first embodiment in that the adhesive label 10 is heated indirectly. Note that a configuration the same as in the first embodiment has the same reference sign as in the first embodiment, and its explanation is omitted.

As illustrated in FIG. 9, heating means 242 in the present modified embodiment employs a thermal light source such as a halogen lamp 251 provided so as to face the adhesive label 10, thereby heating the adhesive label 10. The halogen lamp 251 is placed at a front side of the adhesive label 10 between the second conveyor rollers 28 and the penetration means 241 along the carrying direction F, and projects light toward a front surface of the adhesive label 10. In this case, it is preferable that the printable layer 12 of the adhesive label 10 be a recording layer except a heat-sensitive recording layer or a label on which printing has been performed. Note that the thermal head 230 for adhesive force development of the present modified embodiment mainly includes a substrate 244 placed along the carrying direction F, and a plurality of heating elements 231 arranged along a longitudinal direction on the substrate 244, and the heating elements 231 are arranged at a downstream side along the carrying direction F on a top surface of the substrate 244 and is pressure contacted with a peripheral surface of the platen roller 43 for adhesive force development.

According to the present modified embodiment, the operation-effect similar to the first embodiment can be obtained, and further, since the adhesive label 10 can be indirectly heated, layout characteristics of the heating means 42 can be improved. Note that, the method for indirectly heating the adhesive label 10 is not limited to the above modified embodiment, and may be performed by using warm wind or the like.

Note that a technical range of the present invention is not limited to the aforementioned embodiments, and various modifications can be made within a range which does not beyond a purpose of the present invention.

For example, the first embodiment deals with a configuration in which the heat roller 51 is used as the heating means 42 for directly heating the adhesive label 10, but alternatively, a heating thermal head may be provided separately from the thermal head 30 for adhesive force development.

Figure 10:
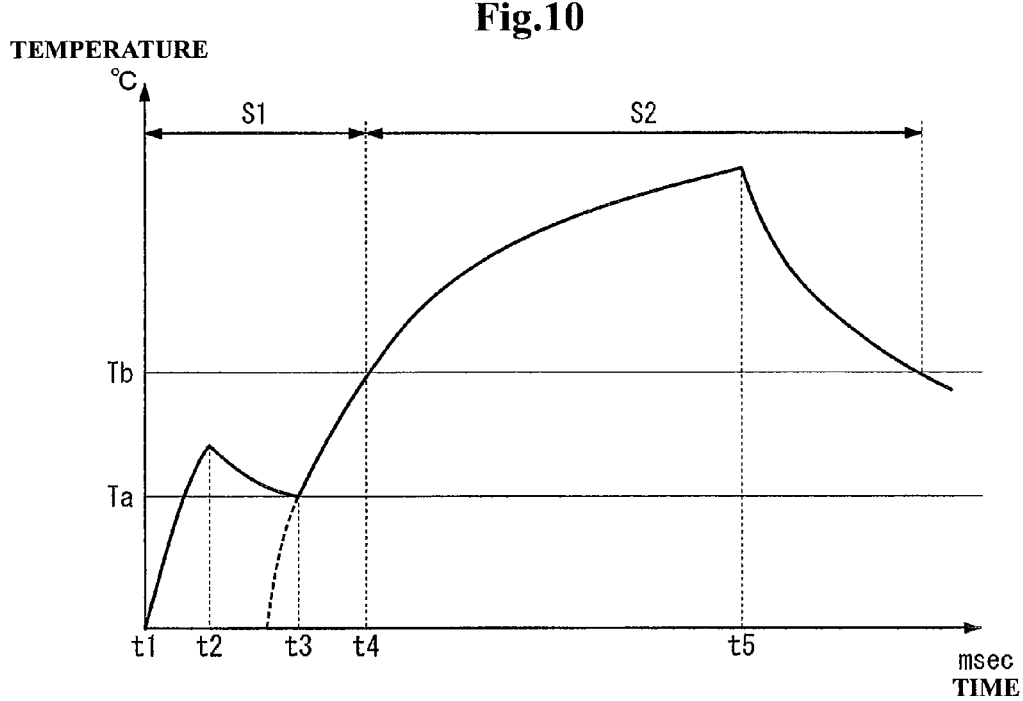
FIG. 10 is a graph illustrating a temperature change (° C.) of an adhesive label when the adhesive label passes through an adhesive force development unit in another configuration of the present embodiment.
Figure 11:
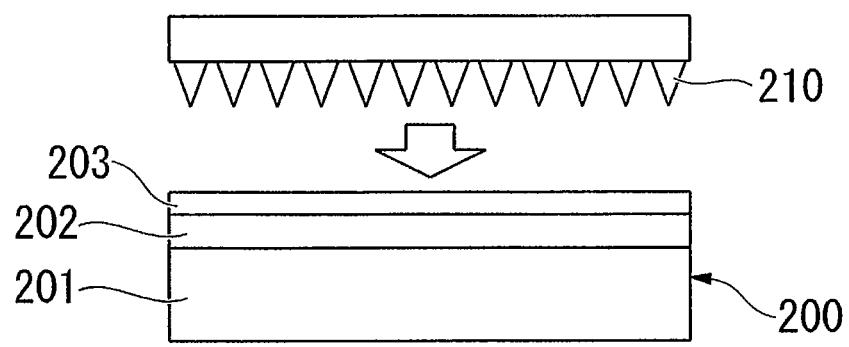
FIG. 11 is a cross-sectional view illustrating a multilayer structure of a conventional adhesive label.
Figure 12:
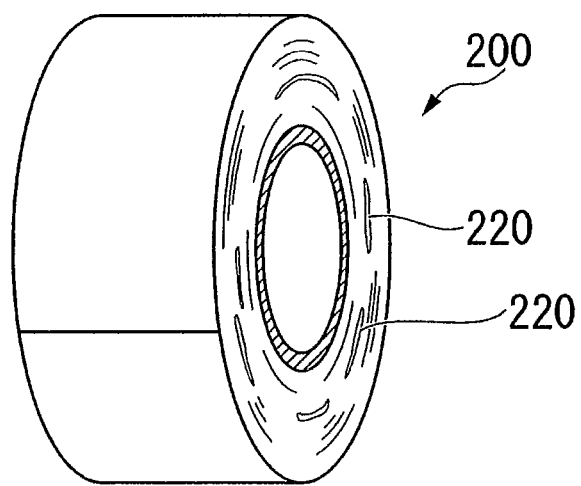
FIG. 12 is a perspective view illustrating a state where a conventional adhesive label is wound into a roll.

With this configuration, as illustrated in FIG. 10, when the adhesive label 10 is heated by the heating thermal head to a temperature not lower than the fluidity improving temperature Ta between a time t1 to a time t2, the viscosity of the adhesive compound can be reduced at a stage before the penetration step (between a time t3 and a time t5). Note that a driving method of the heating thermal head can be performed by pulse driving similarly to the thermal head 30, 230 for adhesive force development as described above. In this case, it is preferable that a driving time (pulse width) of the heating thermal head be set shorter than a driving time (pulse width) of the thermal head 30, 230 for adhesive force development.

Further, the first embodiment deals with a configuration in which the whole adhesive label 10 is heated by the heat roller 51 or the like, but in a case where a heating thermal head is used, it is possible to heat at least only portions where the holes 15 are formed in the adhesive label 10.

Further, the adhesive label 10 may be configured such that a heat insulating layer made from porous resin is provided between the base material 11 and the adhesive layer 13.

Moreover, the first embodiment deals with a configuration in which the heating means 42 is provided at an upstream side of the penetration means 41, but alternatively, the heating means 42 may be provided at a downstream side of the penetration means 41.

Further, the first embodiment deals with a case where the adhesive force development unit 23 of the present invention is applied to a thermal printer, but is not limited in any particular manner.

Furthermore, the printing unit 21 may be disposed at an upstream side relative to the adhesive force development unit 23 in the carrying direction F, and may be disposed, for example, between the cutter unit 22 and the adhesive force development unit 23.

What is claimed is:

1. An adhesive force development unit for developing, by heating, an adhesive force of an adhesive label including a printable layer provided on one surface of a base material, and an adhesive layer provided on the other surface thereof and coated with a non-adhesive functional layer, the adhesive force development unit comprising:
a thermal head having a plurality of heating elements arranged along a width direction of the adhesive label and heating the adhesive label from its adhesive layer side so as to form holes in the functional layer by the heating elements; and
heating means for heating at least hole-forming portions where the holes are formed in the adhesive label at a temperature not more than a penetration temperature, the heating means being disposed at an upstream side or a downstream side relative to the thermal head along a carrying direction of the adhesive label.

2. The adhesive force development unit according to claim 1, wherein the heating means is disposed at an upstream side relative to the thermal head along the carrying direction.

3. The adhesive force development unit according to claim 2, wherein a platen roller for conveying the adhesive label while sandwiching the adhesive label with the thermal head is disposed so as to face the thermal head.

4. The adhesive force development unit according to claim 3, wherein the heating means has a heat roller for conveying the adhesive label while heating the other surface of the adhesive label.

5. The adhesive force development unit according to claim 4, wherein an opposed roller for conveying the adhesive label while sandwiching the adhesive label with the heat roller is disposed so as to face the heat roller.

6. An adhesive-label issue device comprising:
an adhesive force development unit according to claim 5; and a cutter unit disposed at an upstream side relative to the adhesive force development unit in the carrying direction so as to cut belt-shaped label paper in a desired length.

7. A printer comprising:
an adhesive-label issue device according to claim 6; and
a printing unit disposed at an upstream side relative to the adhesive force development unit in the carrying direction and performing printing on the printable layer.

8. The adhesive force development unit according to claim 3, wherein the heating means is a halogen lamp.

9. The adhesive force development unit according to claim 3, wherein:
the thermal head includes a substrate on which the heating elements are arranged, and
the heating means includes a heat generator provided on the substrate so as to heat the adhesive label.

10. The adhesive force development unit according to claim 3, wherein the thermal head preheats the hole-forming portions of the functional layer, and then performs heating to form the holes.

11. An adhesive-label issue device comprising:
an adhesive force development unit according to claim 10; and
a cutter unit disposed at an upstream side relative to the adhesive force development unit in the carrying direction so as to cut belt-shaped label paper in a desired length.

12. A printer comprising:
an adhesive-label issue device according to claim 11; and
a printing unit disposed at an upstream side relative to the adhesive force development unit in the carrying direction and performing printing on the printable layer.

13. The adhesive force development unit according to claim 1, wherein a platen roller for conveying the adhesive label while sandwiching the adhesive label with the thermal head is disposed so as to face the thermal head.

14. The adhesive force development unit according to claim 1, wherein the heating means has a heat roller for conveying the adhesive label while heating the other surface of the adhesive label.

15. The adhesive force development unit according to claim 14, wherein an opposed roller for conveying the adhesive label while sandwiching the adhesive label with the heat roller is disposed so as to face the heat roller.

16. The adhesive force development unit according to claim 1, wherein the heating means is a halogen lamp.

17. The adhesive force development unit according to claim 1, wherein:
the thermal head includes a substrate on which the heating elements are arranged, and
the heating means includes a heat generator provided on the substrate so as to heat the adhesive label.

18. The adhesive force development unit according to claim 1, wherein the thermal head preheats the hole-forming portions of the functional layer, and then performs heating to form the holes.

19. An adhesive-label issue device comprising:
an adhesive force development unit according to claim 1; and
a cutter unit disposed at an upstream side relative to the adhesive force development unit in the carrying direction so as to cut belt-shaped label paper in a desired length.

20. A printer comprising:
an adhesive-label issue device according to claim 19; and
a printing unit disposed at an upstream side relative to the adhesive force development unit in the carrying direction and performing printing on the printable layer.

* * * * *